Feb. 26, 1929.　　　　　　　　　　　　　　　　1,703,833
T. J. STURTEVANT
AIR SEPARATOR
Filed June 3, 1926　　　5 Sheets-Sheet 1

Feb. 26, 1929.

T. J. STURTEVANT 1,703,833

AIR SEPARATOR

Filed June 3, 1926     5 Sheets-Sheet 4

Inventor:
Thomas J. Sturtevant,
by Henry T. Williams
Atty

Feb. 26, 1929.  T. J. STURTEVANT  1,703,833
AIR SEPARATOR
Filed June 3, 1926   5 Sheets-Sheet 5

Patented Feb. 26, 1929.

1,703,833

UNITED STATES PATENT OFFICE.

THOMAS J. STURTEVANT, OF WELLESLEY, MASSACHUSETTS, ASSIGNOR TO STURTE-VANT MILL COMPANY, OF BOSTON, MASSACHUSETTS, A CORPORATION OF MASSA-CHUSETTS.

AIR SEPARATOR.

Application filed June 3, 1926. Serial No. 113,395.

The invention to be hereinafter described relates to air separators for grading materials, wherein the separation is accomplished by an air current moving upward in the separating chamber and downward in a settling chamber. The air current is induced by a fan and is caused to circulate through the chambers. The materials to be graded are fed into the separating chamber and are received by a rotary distributor which throws the materials out across the rising air current under the influence of centrifugal force. The heavier particles gravitate down through the air current in the separating chamber and are delivered therefrom through a discharge spout, whereas, the lighter particles are carried upward by the air current over into the settling chamber where they gravitate downward therein for delivery through a discharge spout.

The purpose of the present invention is to provide a separator of the type referred to, with improved features contributing to the efficiency of separation, the strength and durability of the construction and ready accessibility to parts experiencing wear that inspection thereof and substitution of new parts for worn ones may be readily accomplished.

The character of the invention may be best understood by reference to the following description of one good form of the invention shown in the accompanying drawings, wherein:

Fig. 3ª is a detail to be referred to;

Figure 1:
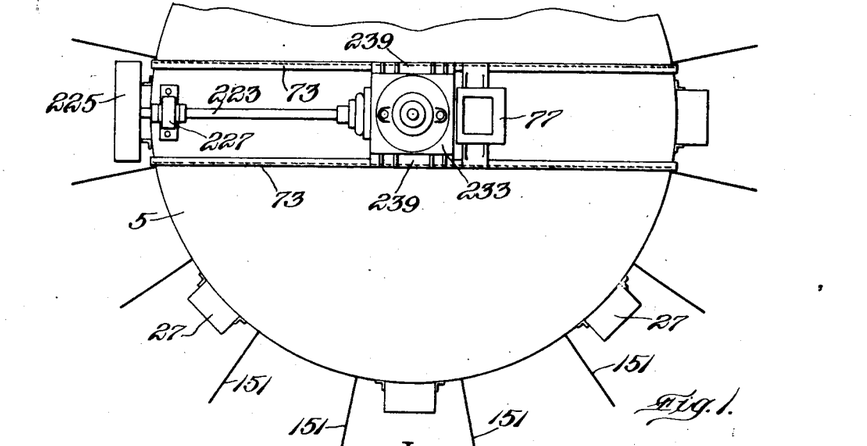
Figure 1 is a plan of a portion of a separator embodying the invention.
Figure 2:
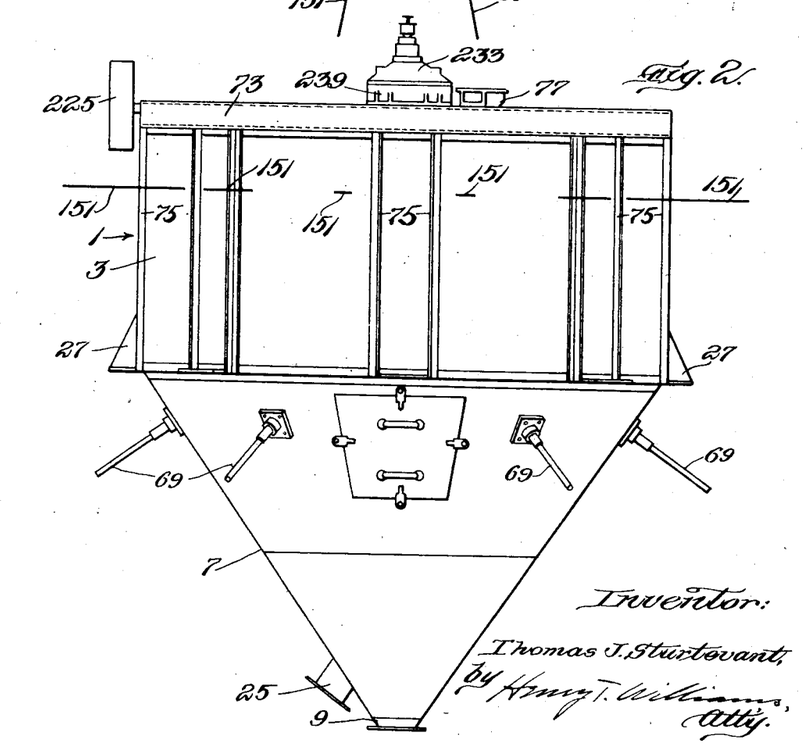
Fig. 2 is a side elevation of the separator.
Figure 3:
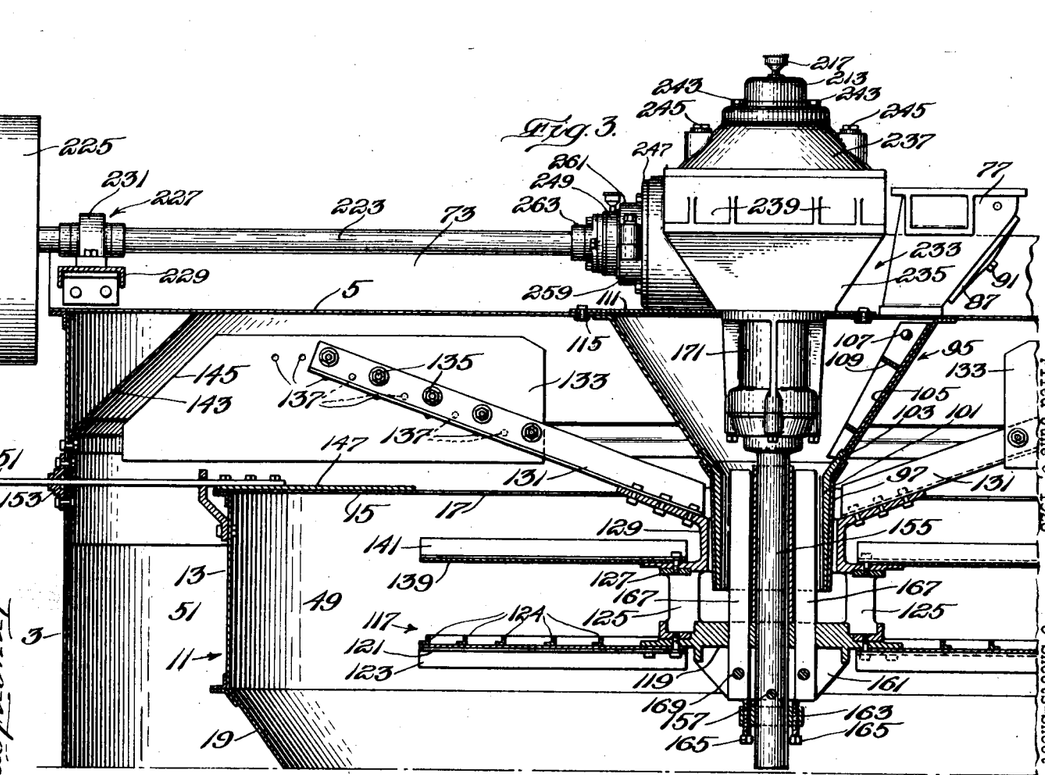
Fig. 3 on an enlarged scale is a vertical section through the upper portion of the separator.
Figure 3A:
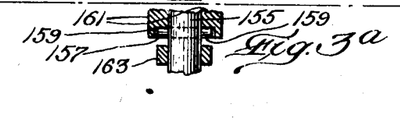

Referring to the drawings, the air separator shown therein as one good form of the invention, comprises an outer casing 1 (Figs. 1, 2 and 3) consisting of a drum 3 having a head 5 at the upper end thereof. Projecting down from the drum is a cone 7 having a discharge spout 9. Within and spaced from the outer casing is an inner casing 11 consisting of a drum 13 having a head 15 at the top thereof in which is an outlet opening 17 to be referred to. Projecting down from the drum 13 is an upper conical shell 19. Beneath and spaced from the upper shell is a lower conical shell 21 having angle iron stiffening ribs 23. The lower end of the cone 21 has a spout 25 attached thereto and projecting through the shell 7 of the outer casing.

Figures 4, 5, 6:
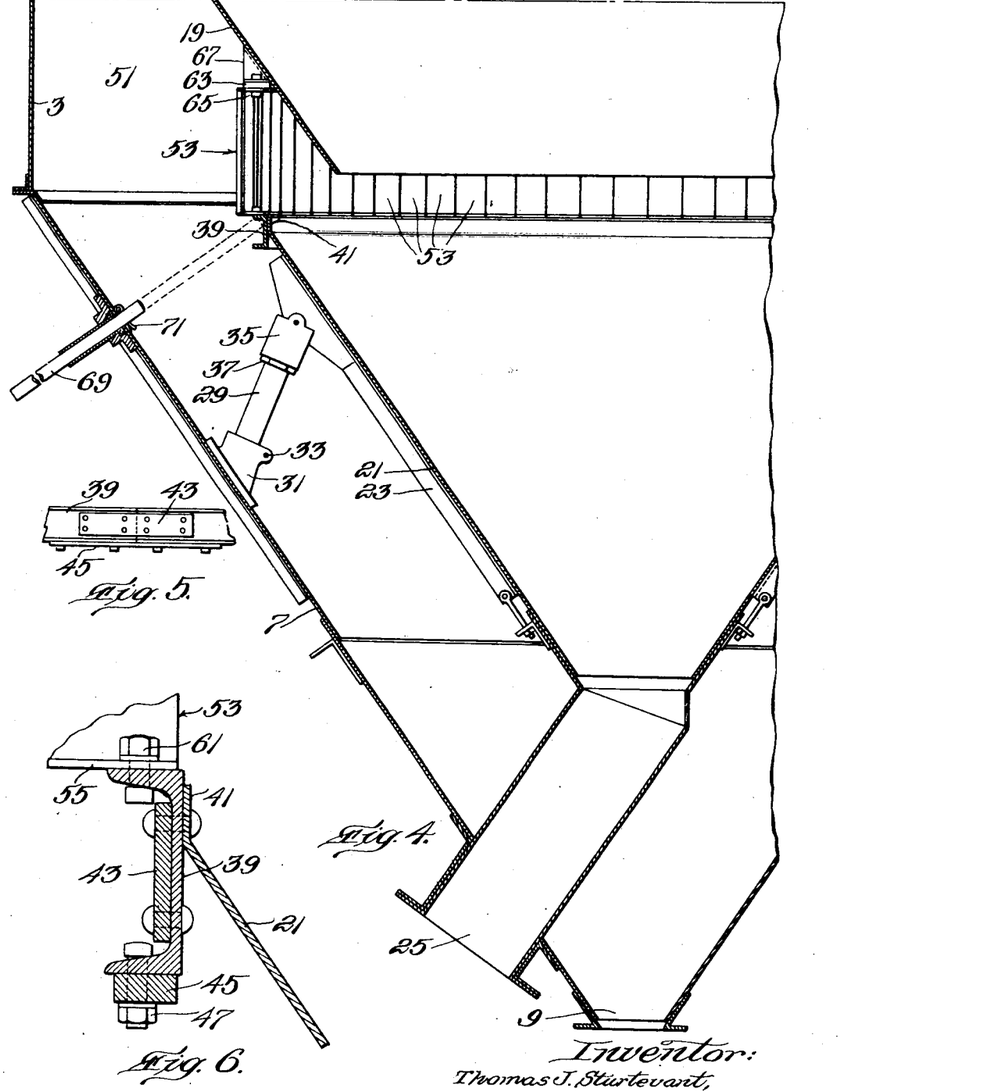
Fig. 4 on an enlarged scale is a vertical section through the lower portion of the separator.
Fig. 5 is a side view of portions of the channel ring and the fish plate connecting the same.
Fig. 6 on an enlarged scale is a vertical section through the channel shaped ring and parts associated therewith.

Brackets 27 are attached to the outer shell and are adapted to rest upon I-beams or other convenient support for the separator. The inner casing 11 is mounted on and supported by the cone 7 of the outer casing, and to accomplish this, legs 29 (Fig. 4) are provided, in the present instance, four in number, each of said legs having its lower end swivelled in a split socket 31 secured to the cone 7 and provided with a clamp screw 33. The upper end of each leg is threaded to a cap 35 pivotally connected to one of the angle bars 23 of the lower shell 21 of the inner casing. A lock nut 37 is threaded on the leg and is adapted to bear against the cap 35. The construction is such that on release of the clamp screws 33 and lock nuts 37, the legs 29 may be given a rotative adjustment, thereby to raise or lower the inner casing properly to level the same. Then the clamp screws and nuts may be set up to secure the legs in the positions to which they have been adjusted. At the upper end of the lower conical shell 21 is a channel-shaped ring 39 (Figs. 4, 5 and 6), the back of the ring being secured by rivets to upstanding portions 41 of the lower shell 21. The ring is formed from a straight channel which is bent into proper form, and overlapping the meeting end portions of the ring is a fish plate 43 through which rivets extend. A plate 45 may also be provided beneath the lower flange of the ring and overlapping the end portions of the latter, said plate being secured to said flange by bolts 47.

Figures 10, 11, 12:
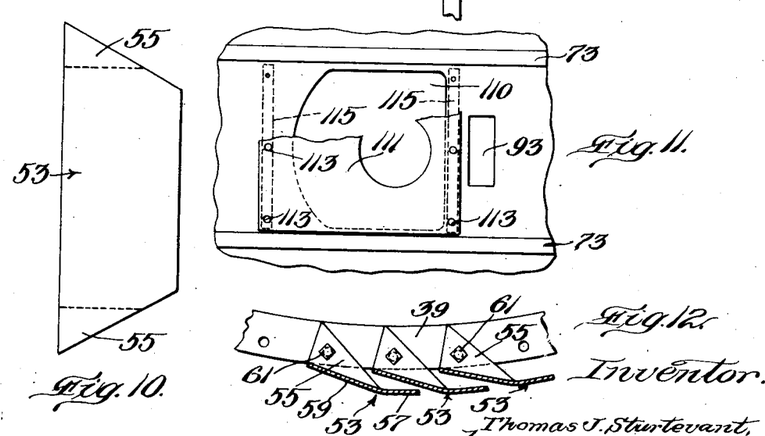
Fig. 10 is a view of the blank from which one of the vanes is formed.
Fig. 11 is a plan of a portion of the top of the separator showing the opening above the lower hopper and the cover for the opening.
Fig. 12 is a sectional detail of a portion of the channel shaped ring and vanes pivotally connected thereto.

Within the inner casing is a separating chamber 49 (Fig. 3), and between the outer casing and the inner casing is an annular-shaped settling chamber 51. The space between the upper and lower conical shells 19 and 21 referred to, constitutes an inlet through which the air may pass from the settling chamber into the separating chamber. To regulate and promote whirl of the air passing through said inlet, a series of vanes 53 (Figs. 4, 10 and 12) is provided, each of said vanes being formed from a blank of trapezoid shape. Wings 55 are bent transversely to the plane of the blank. Each vane has portions 57 and 59 bent at an obtuse angle with respect to each other so that the vane has an angular form materially contributing to the stiffness thereof. The vanes are pivotally mounted on the upper flange of the chanel-shaped ring 41 by bolts 61 extending through registering holes in the lower wings 55 and in said flange. Said vanes are also pivotally connected to a ring 63 by bolts 65 entered through registering holes in the upper wings 55 and in the ring 63, the latter being carried by brackets 67 secured to the upper conical shell 19. The construction is such that the vanes may be individually adjusted to vary the effective inlet, the angular shape of the vanes enabling the vanes to be adjusted so as almost to close the inlet. The vanes also serve to support the upper shell 19 and the drum 13 of the inner casing on the lower conical shell. The friction between the channel and the lower wings 55 and the friction between the ring 63 and the upper wings 55 will be sufficient to maintain the vanes in the positions to which they are adjusted. The angular shape of the vanes desirably stiffens the same and prevents them from buckling under the load to which they are subjected.

To prevent materials from collecting and building up on the channel ring and the lower wings 55 of the vanes, and to prevent consequent variation of the effective inlet opening and variation in the velocity distribution of the air current passing between the vanes, hammer pins 69 (Figs. 2 and 4) may be provided entered through holes in the cone 7 of the outer casing. These hammer pins are adapted to project toward and engage the channel ring, and may be struck by a mallet from time to time, thereby to dislodge any materials which have accumulated as described. Cotter pins 71 on the hammer pins are adapted to engage the inner surface of the cone 7 and prevent the hammer pins from dropping out through the cone 7 when not in use.

Resting upon the outer casing head 5 referred to, are a pair of channels 73 (Figs. 1, 2, 3, 7 and 11), said casing being stiffened by upright angle bars 75 resting on the brackets 27 referred to and extending along the exterior of the outer casing drum. The materials to be graded are fed into the separator through an upper hopper 77 between the channels 73 and secured thereto. A flap valve 79 (Fig. 7) is provided in this hopper and is secured to a rock shaft 81 having an arm 83 with a weight 85 thereon. The construction is such that flow of materials through the hopper will hold the valve open, and when the flow of materials through the hopper ceases the weight 85 will close the valve and thereby prevent any outdraft of air through the hopper.

It is desirable that provision shall be made for admitting air into the separator, in order that the air after being circulated for some time shall not become sufficiently saturated with moisture to cause the particles of materials to adhere together. To admit air into the separator, a damper 87 (Figs. 7 and 8) is provided and is adapted to vary the cover openings 89 in the wall of the hopper, said damper being secured by a screw bolt 91 to the hopper with sufficient friction to hold the same in different positions of pivotal adjustment.

At the lower end of the hopper is an opening 93 in the outer casing head 5 through which the materials may pass to a lower hopper 95 of conical form and having a neck 97 projecting downward into the separating chamber. The upper end of the lower hopper has an outstanding flange 99 secured to the head 5. To protect the lower hopper from wear, its neck may be provided with a lining sleeve 101 having an outwardly flaring flange 103 resting in the lower end of the conical portion of the hopper. To further protect the lower hopper from wear, a lining plate 105 may be provided directly beneath the upper hopper 77 and extending down to the lining sleeve 101, said lining plate being curved to conform to the contour of the conical portion of the upper hopper. This lining plate is detachably secured to the hopper by bolts 107. Webs or ledges 109 extend transversely of the curved lining plate 105 in a general horizontal direction. The construction is such that materials flowing from the upper hopper into the lower hopper will build up on said ledges and the accumulation of material thereon will serve to protect the lining plate from wear.

It is important that ready access may be had to the lining sleeve 101 and the lining plate 105, in order that they may be quickly and easily removed and new ones substituted therefor from time to time, so that said separator shall be inoperative from such cause for a minimum length of time. Accordingly, the head 5 of the outer casing is provided with an opening 110 (Fig. 11) of ample size above the lower hopper and between the channels 73 referred to. This opening is provided with a cover 111 secured to the head by screw bolts 113 which extend through bars 115 beneath and secured to the head.

The materials are delivered through the neck of the lower hopper to a rotary distributor 117 (Fig. 3) comprising a hub 119 and a plate 121 formed of sections having downwardly projecting flanges 123. The plate 121 has a series of angle shaped rings 124 thereon which will cause the materials to build up within and against the rings and protect the plate from wear. Under the influence of centrifugal force the materials will flow along the plate with progressive impacts against the rings or the banks of materials accumulated against them, which will tend to break up larger particles formed by smaller particles adhering together.

The hub 119 has posts 125 rising therefrom and at the upper ends of said posts is a ring 127. Mounted on and secured to said ring is a hub 129 of a fan comprising arms 131 secured to said hub and carrying blades 133 which are adjustably secured to the arms by bolts 135 adapted for insertion in rows of staggered holes 137 in the blades, the construction being such that the blades may be adjusted toward or from the outer casing for a purpose to be described.

Secured to the fan hub 129 and the ring 127 is a baffle plate 139 formed of sections, and having flanges or vanes 141 projecting up therefrom constituting a centrifugal agitator, said baffle plate being located between the distributor 117 and the outlet in the head of the inner casing. The air current rising in the separating chamber must pass outward between the perimeter of the baffle plate and the inner casing wall in approaching the separating chamber outlet 17. The vanes 141 intensify the whirl of the air in the separating chamber adjacent to the head thereof, thereby throwing heavier particles outward toward the drum 13 and preventing them from being carried up through the outlet. The vanes 141 also tend to break up larger particles, thereby increasing the percentage of fines passing over into the settling chamber. The adjustable connection of the blades 133 with the arms 131 of the fan enables said blades to be adjusted outward toward the outer casing to increase the effective radius of the fan and increase the velocity of the air passing down in the settling chamber without substantial alteration in the whirl or centrifugal effect produced by the vanes 141 in the upper end of the separating chamber. This adjustment is desirable when a change in the relative sizes of the particles of the materials separated is required.

To prevent eddy currents in the outer casing in the space adjacent the juncture of the drum 3 with the head 5, such as would reduce the velocity of the air current blown by the fan down in the settling chamber, a frusto-conical lining plate 143 (Fig. 3) may be provided and suitably secured to the outer casing, said plate being located in the plane of the fan blades and encircling the same. To enable the fan blades to be adjusted outward closely adjacent to said frusto-conical plate, the blades may have outer edges 145 which may be substantially parallel with the frusto-conical plate and oblique with respect to the axis of rotation of the fan. The construction is such that the blades and the frusto-conical plate will cooperate to promote velocity of the air passing down through the settling chamber.

The strong air current and blast of particles against the lining plate 143 subject it to wear, therefore, this plate is detachably secured by bolts to the drum and can be removed and a new one substituted in its place. This plate protects the upper portion of the drum wall from wear.

Figure 9:
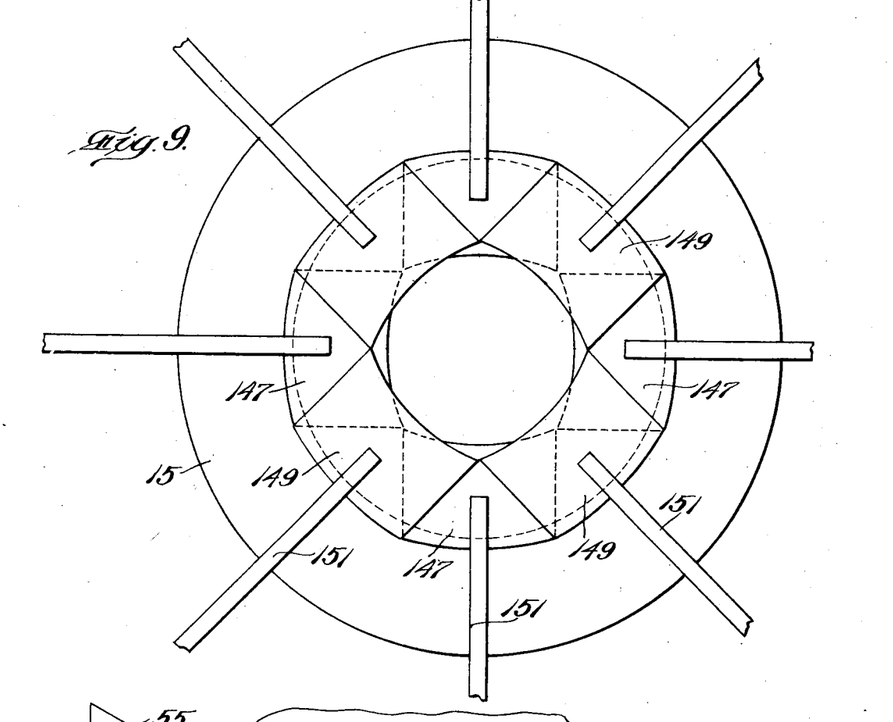
Fig. 9 is a plan of the valve at the opening in the inner casing head.

Under certain conditions it may be desirable to vary the effective opening of the outlet 17 in the head of the separating chamber. To accomplish this, a valve is provided comprising a series of lower plates 147 (Figs. 3 and 9) resting upon the inner casing head, said plates being of general oblong shape and in spaced relation to one another. Superposed upon the lower plates are upper plates 149 of similar shape and disposed to cover the spaces between the lower plates. Each of the plates has a rod 151 secured thereto and projecting radially outward through a guide 153 on the outer casing, said rods being accessible externally of the outer casing for adjustment to vary the effective opening at the outlet.

The distributor, baffle plate and fan are connected to rotate together as a unit. They are carried by an upright shaft 155 (Figs. 1 and 7) projecting down through a hole in the cover 111 and through and beyond the lower hopper 95. The shaft is connected to the distributor hub 119 by a through pin 157 (Figs. 3 and 3ª) which passes through a hole in the shaft and enters recesses 159 in webs 161 of the hub, said pin being prevented from escape by engagement of its ends with the backs of said recesses. A collar 163 is secured to the shaft and carries jack screws 165 which engage the lower edges of the webs 161. The construction is such that the jack screws may be adjusted to lift the hub upward and thereby move the recesses 159 up from the pin 157, thereby exposing said pin so that it may be removed from the shaft. The ring 163 may then be released from the shaft, and the distributor, baffle and fan unit may be allowed to drop down somewhat so that the lower edges of the fan blades rest upon and are supported by the inner casing head.

To stir the materials passing down through the hoppers to the distributor, vertical blades 167 (Fig. 3) are provided and entered up through slots in the hub and detachably secured to the hub webs 161 by bolts 169.

The shaft is provided with a housing 171 (Fig. 7) which projects down from a gear box to be described through the hole in the cover 111 and into the lower hopper. This housing has a cap 173 which is detachably secured to the body of the housing by screw bolts 175. Formed in the cap is a pocket 177 adapted to receive felt or other suitable packing above which is a gland 179. Mounted in the cap is an end thrust bearing comprising a ring 181 larger than the shaft and resting on a shoulder 183 of the cap. This ring has a curved seat 185 on which rests a similar shaped surface of a lower raceway 187 above which is an upper raceway 189, balls 191 being interposed between said raceways. The housing has a counterbore 193 receiving a side thrust bearing comprising an outer raceway 195, an inner raceway 197 and balls 199 interposed between said raceways. The inner raceway is mounted on a reduced portion 201 of the shaft and rests upon the upper raceway 189 of the end thrust bearing.

Figures 7, 8:
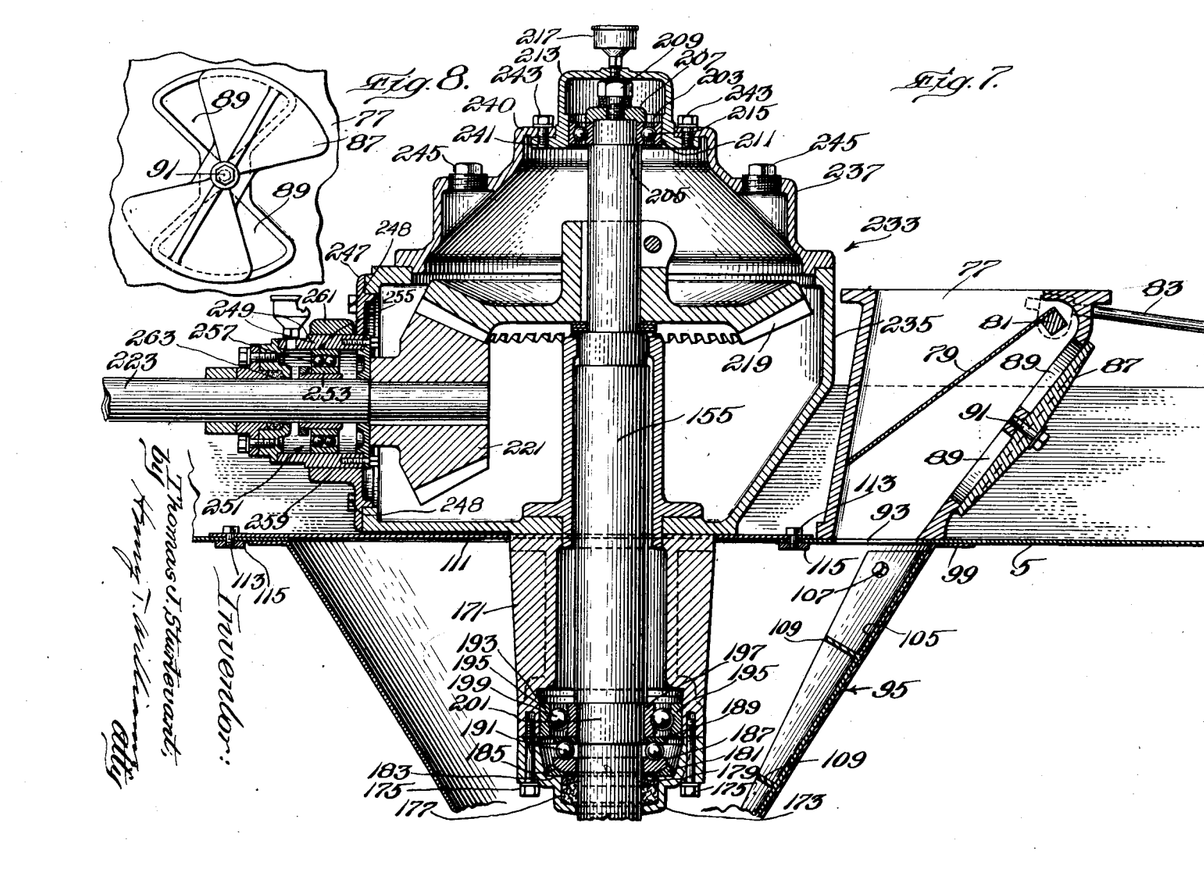
Fig. 7 is a vertical section through a portion of the separator including the gear box, shaft housing and the upper and lower hoppers.
Fig. 8 is a detail of the upper hopper damper.

In assembling the parts, the pocket 177 is filled with the packing sufficiently to cause the gland 179 to project somewhat above the shoulder 183, and when the screw bolts 175 are set up to secure the cap to the housing, the gland will be forced downward and thereby press the packing in the pocket tightly against the shaft, thereby to prevent lubrication from working along the shaft down beyond the cap, and also to prevent dust from working up along the shaft and causing injury to the bearings. This is an important feature, since if dust could reach the bearings it would cause them to become quickly worn out. The lower raceway 187 of the end thrust bearing can rock somewhat on the seat 185 and the ring 181 can slide on the shoulder 183, thereby to permit the end thrust bearing to align itself automatically with respect to the shaft.

The upper end of the shaft is provided with a side thrust bearing 203 comprising an inner raceway 205 on the reduced end of the shaft and secured by a head 207 and a screw bolt 209. An outer raceway 211 is carried by a cap 213 and balls 215 are interposed between said raceways. At the top of the cap a lubricant receiving cup 217 is provided. Fast on the shaft is a gear 219 meshing with a pinion 221 on a horizontal countershaft 223 provided with a pulley 225 adapted to be driven from any suitable source of power. The shaft is journalled in an outer bearing 227 mounted on a channel 229 extending between and supported by the channels 73 referred to. This bearing is in a housing 231 secured by screw bolts to the channel 229.

Ring shims 232 (Fig. 7) encircle the upright shaft and are interposed between a shoulder on said shaft and the gear 219. These shims enable adjustment of the gear 219 into proper meshing relation with the pinion 221. When the gears become worn, one or more of the shims may be removed to give the gears proper meshing relation.

The gear and pinion are enclosed in a box 233 comprising a lower part 235 and an upper part or cover 237, said lower part being provided with brackets 239 adapted to rest upon and be secured to the upper flanges of the channels 73. The gear box projects down between said channels, and the shaft housing 171 referred to is secured to the bottom of the box. The upper part of the gear box has an opening therein and an internal flange 240 adapted to overlap a lip 241 projecting outward from the cap 213 referred to, said flange being detachably secured to said lip by screw bolts 243. The upper part of the gear box has plugs 245 which are removable to permit introduction of grease into the gear box. When it is desired to have access to the gear 219 for the purpose of adjusting the same with respect to the shaft to secure proper meshing engagement of the gear with the pinion, the upper part or cover 237 of the gear box, on release of the screw bolts 243, may be lifted up and away without disturbing the bearing 203 in the cap 213.

The gear box has a head or cover 247 secured by screw bolts 248 to the lower part of the box, and this head is provided with a housing 249 in which is a bearing 251 for the pinion shaft, said bearing comprising an inner raceway 253, an outer raceway 255 and balls 257 interposed between said raceways. The housing rests on a curved seat 259 integral with the head and is secured by a clamp 261 connected by bolts to the seat. A stuffing box 263 is provided in the housing for preventing dust from working along the horizontal shaft into the housing and for preventing lubricant from escaping from the housing out along the shaft. The cover 237 is removable to permit the gear 219 to be taken from the box, and the cover 247 is removable to permit the pinion 221 to be taken from the box and thus either can be removed without disturbing the other.

When it is desired to have access to the interior of the lower hopper for the purpose of substituting a new lining sleeve and a new lining plate for the sleeve 101 and the plate 105, the shaft may be disconnected from the distributor hub 119 as described above, the head 247 may be removed from the gear box, and the housing 231 for the outer bearing of the horizontal shaft may be removed from the channel 229. This will allow the horizontal shaft and the pinion thereon to be shifted longitudinally so as to remove the pinion from the gear box. Then the brackets 239 on the gear box may be released from the channels 73. Thereupon, the gear box, the shaft housing 171 and the shaft may be removed as a unit from the separator. This will expose the cover 111 which may be lifted up away from the outer casing head after removal of the screw bolts 113. This leaves the lower hopper open with free access to the linings therein for the purpose of substituting new ones for the worn ones. The ready accessibility to these parts enables the substitution to be quickly made, and as a consequence, the separator is rendered inoperative for separating materials from this cause for a minimum length of time.

The adjustable legs 29 supporting the inner casing 11, the baffle plate 139, the adjustable valve plates 147 and 149 for varying the opening in the head of the inner casing, and the stirring blades 167 are similar to those disclosed in Letters Patent No. 1,615,558, granted to me January 25, 1927.

It will be understood that the invention is not limited to the specific embodiment shown and that various deviations may be made therefrom without departing from the spirit and scope of the appended claims.

What is claimed is:—

1. An air separator comprising, in combination, a casing having a separating chamber and a settling chamber, a fan above the separating chamber for causing air to circulate through said chambers, said fan having blades with outer edges oblique to the axis of rotation of the fan, and a frusto-conical lining plate in the casing adjacent to the oblique edges of the blades and cooperating therewith to promote the velocity of the air passing through the settling chamber.

2. An air separator comprising, in combination, a casing having a separating chamber and a settling chamber, a fan above the separating chamber comprising arms and blades secured to said arms having outer edges oblique to the axis of rotation of the fan, and a frusto-conical lining plate in the casing and encircling the fan, said blades being adjustably secured to said arms, thereby to vary the distance of their oblique edges from said frusto-conical plate.

3. An air separator comprising, in combination, an outer casing having a cylindrical portion and a head at the upper end of the cylindrical portion, an inner casing containing a separating chamber and spaced from the outer casing to provide a settling chamber, a fan above the separating chamber beneath said head, and a removable frusto-conical lining plate encircling the fan and located adjacent the juncture of the head with the cylindrical portion of the outer casing, said frusto-conical plate and fan cooperating to promote velocity of the air passing down through the settling chamber.

4. An air separator comprising, in combination, a separating chamber, a settling chamber, a fan above the separating chamber for causing air to whirl and circulate through said chambers, said separating chamber having an outlet in the upper end thereof, a shaft for the fan, a centrifugal agitator on the shaft in the separating chamber beneath the outlet for intensifying the whirl of the air in the separating chamber, and a frusto-conical plate encircling the fan, said fan having blades and means for adjusting said blades toward or away from said plate, thereby to vary the velocity of the air passing down through the settling chamber without substantial change of the centrifugal effect of the agitator in the separating chamber.

5. An air separator comprising, in combination, a separating chamber, a settling chamber, a fan above the separating chamber for causing air to whirl and circulate through said chambers, said separating chamber having an outlet in the upper end thereof, a shaft for the fan, and a centrifugal agitator on the shaft in the separating chamber beneath the outlet for intensifying the whirl of the air in the separating chamber, said fan having blades and means for adjusting said blades, thereby to vary the velocity of the air passing down through the settling chamber without substantial change of the centrifugal effect of the agitator in the separating chamber.

6. An air separator comprising, in combination, an outer casing, an inner casing comprising upper and lower shells spaced from the outer casing, a series of vanes interposed between said shells and supporting the upper shell from the lower shell, each of said vanes having portions disposed at an obtuse angle to resist buckling.

7. An air separator comprising, in combination, an outer casing, an inner casing comprising upper and lower shells spaced from the outer casing, a series of vanes interposed between said shells and supporting the upper shell from the lower shell, each of said vanes having pivot wings extending transversely to the body of the vanes, and each of said vanes having portions disposed at an obtuse angle to resist buckling.

8. An air separator comprising, in combination, an outer casing, an inner casing comprising upper and lower shells having a space between them, a channel-shaped ring secured to the lower shell, and a series of vanes mounted on said ring and supporting the upper shell.

9. An air separator comprising, in combination, an outer casing, an inner casing comprising upper and lower shells in spaced relation, a channel-shaped ring having a web and flanges, said lower shell having portions secured to the back of the channel-shaped ring, and a series of vanes mounted on said ring and supporting said upper shell.

10. An air separator comprising, in combination, an outer casing, an inner casing containing a separating chamber and comprising upper and lower shells, said inner casing being spaced from the outer casing to provide a settling chamber, a ring on the lower shell, a series of whirl promoting vanes on the ring and between the upper and lower shells, said vanes having spaces between them forming an inlet, said separating chamber having an outlet, a fan for causing air to circulate from the settling chamber through the inlet up through the separating chamber and down in the settling chamber, means to introduce materials to be separated into the rising current of air in the separating chamber, and means operable on the ring for jarring the ring and vanes, thereby to dislodge materials therefrom, said means being normally away from the ring.

11. An air separator comprising, in combination, an outer casing, an inner casing containing a separating chamber and comprising upper and lower shells, said inner casing being spaced from the outer casing to provide a settling chamber, a ring on the lower shell, a series of whirl promoting vanes on the ring and between the upper and lower shells, said vanes having spaces between them forming an inlet, said separating chamber having an outlet, a fan for causing air to circulate from the settling chamber through the inlet up through the separating chamber and down in the settling chamber, means to introduce materials to be separated into the rising current of air in the separating chamber, and tapping rods normally away from the ring and projecting through the outer casing toward the ring and adapted to tap the ring to dislodge materials from the ring and vanes.

12. An air separator comprising, in combination, an outer casing, an inner casing comprising upper and lower shells in spaced relation, said inner casing having a separating chamber therein and said casings being spaced to provide a settling chamber, a channel-shaped ring secured to the upper edge of the lower shell, a series of whirl promoting vanes between said ring and the upper shell, and tapping rods extending through the outer casing toward said ring and operable to engage and jar said ring to dislodge materials therefrom.

13. An air separator comprising, in combination, a separating chamber, a settling chamber, a fan for causing air to circulate through said chambers, means including a hopper for introducing materials to be graded into the separating chamber, and a damper for the hopper permitting air to flow therein and facilitate entrance of the materials into the separating chamber.

14. An air separator comprising, in combination, a casing having a head with an opening therein, a cover for said opening, an inner casing containing a separating chamber, a conical hopper projecting down from said head into the separating chamber, and a lining plate for said hopper, said cover being removable to permit access to said lining plate to enable substitution of another lining plate therefor.

15. An air separator comprising, in combination, a casing having a head with an opening therein, a cover for said opening, a lower hopper projecting down from the head into the separating chamber, an upper hopper for delivering materials to the lower hopper, a lining plate in the lower hopper for receiving the impact of materials flowing from the upper hopper into the lower hopper, said cover being removable to permit access to the lining plate in substituting another therefor.

16. An air separator comprising, in combination, a separating chamber, a settling chamber, means for causing air to circulate through said chambers, a rotary distributor in the separating chamber, and means for delivering materials to be graded to the central portion of the distributor, the latter being provided with rings on the upper side of the distributor against which materials may bank, when flowing outward on the distributor under the influence of centrifugal force, thereby to protect the distributor from wear.

17. An air separator comprising, in combination, an outer casing, an inner casing therein having a separating chamber, said casings being spaced to provide a settling chamber, said inner casing having an opening in the upper end thereof, a shaft projecting through said opening, a hub carried by the shaft and located in the separating chamber, arms projecting from said hub up through said opening into the space between the upper ends of the casings, and blades mounted on said arms and located in said space.

18. An air separator comprising, in combination, an outer casing, an inner casing in and spaced from the outer casing to provide a settling chamber between them, said inner casing having a separating chamber and an opening in the upper end thereof, and a fan carried by the shaft comprising a hub located directly beneath said opening, arms projecting obliquely from the hub through the opening into the space between the upper ends of the casings, and blades in said space and secured to said arms.

19. In a separator for grading materials of the class wherein a fan causes air to circulate through separating and settling chambers, the combination of upper and lower hoppers for delivering materials into the separating chamber, and a lining plate in the lower hopper for receiving the impact of materials flowing from the upper hopper to the lower hopper, said lining plate being removable to permit another to be substituted therefor.

20. In a separator for grading materials of the class wherein a fan causes air to circulate through separating and settling chambers, the combination of a hopper for conducting materials into the separating chamber, and means in the hopper on which materials may accumulate to reduce wear on the hopper.

21. In a separator for grading materials of the class wherein a fan causes air to circulate through separating and settling chambers, the combination of a conical hopper for conducting materials into the separating chamber, a transversely curved lining plate secured to the wall of the hopper for receiving the impact of materials flowing through the hopper, and a web extending transversely of said plate on which materials may accumulate and reduce wear from the materials on the lining plate.

22. In a separator for grading materials of the class wherein a fan causes air to circulate through separating and settling chambers, the combination of a conical hopper for conducting materials into the separating chamber, and a lining plate for the hopper having ledges on which materials may accumulate to reduce wear on the lining plate.

23. In a separator for grading materials of the class wherein a casing has separating and settling chambers and a fan for causing the air to circulate through said chambers, the combination of a hopper and a lining for the hopper to protect the same from wear, said casing having an opening above the hopper and a cover therefor, and said lining being removable up through said hopper and opening.

THOMAS J. STURTEVANT.

DISCLAIMER 1,703,833.—*Thomas J. Sturtevant*, Wellesley, Mass. AIR SEPARATOR. Patent dated February 26, 1929. Disclaimer filed March 31, 1931, by the assignee, *Sturtevant Mill Company*.

Hereby enters this disclaimer to said claims 1 and 3 of said Letters Patent which are in the following words:

"1. An air separator comprising, in combination, a casing having a separating chamber and a settling chamber, a fan above the separating chamber for causing air to circulate through said chambers, said fan having blades with outer edges oblique to the axis of rotation of the fan, and a frusto-conical lining plate in the casing adjacent to the oblique edges of the blades and cooperating therewith to promote the velocity of the air passing through the settling chamber."

"3. An air separator comprising, in combination, an outer casing having a cylindrical portion and a head at the upper end of the cylindrical portion, an inner casing containing a separating chamber and spaced from the outer casing to provide a settling chamber, a fan above the separating chamber beneath said head, and a removable frusto-conical lining plate encircling the fan and located adjacent the juncture of the head with the cylindrical portion of the outer casing, said frusto-conical plate and fan cooperating to promote velocity of the air passing down through the settling chamber."

[*Official Gazette April 14, 1931.*]